United States Patent
Kaji et al.

(10) Patent No.: US 9,653,717 B2
(45) Date of Patent: May 16, 2017

(54) SEPARATOR FOR ELECTROCHEMICAL ELEMENT, PROCESS FOR PRODUCING SEPARATOR AND ELECTROCHEMICAL ELEMENT USING SEPARATOR

(71) Applicant: MITSUBISHI PAPER MILLS LIMITED, Tokyo (JP)

(72) Inventors: Hiroo Kaji, Tokyo (JP); Toshihiro Shigematsu, Tokyo (JP)

(73) Assignee: MITSUBISHI PAPER MILLS LIMITED, Tokyo (JP)

( * ) Notice: Subject to any disclaimer, the term of this patent is extended or adjusted under 35 U.S.C. 154(b) by 417 days.

(21) Appl. No.: 14/468,642

(22) Filed: Aug. 26, 2014

(65) Prior Publication Data

US 2015/0064573 A1 Mar. 5, 2015

(30) Foreign Application Priority Data

Aug. 30, 2013 (JP) ................................. 2013-178868
Jul. 11, 2014 (JP) ................................. 2014-143474

(51) Int. Cl.
*H01M 2/16* (2006.01)
*D21H 11/18* (2006.01)
*D21H 13/02* (2006.01)
*H01M 2/14* (2006.01)

(52) U.S. Cl.
CPC .......... *H01M 2/1626* (2013.01); *D21H 11/18* (2013.01); *D21H 13/02* (2013.01); *H01M 2/145* (2013.01)

(58) Field of Classification Search
None
See application file for complete search history.

(56) References Cited

U.S. PATENT DOCUMENTS

| | | | |
|---|---|---|---|
| 6,338,772 B1 | 1/2002 | Nakagawa et al. | |
| 6,905,798 B2 * | 6/2005 | Tsukuda | D21H 15/02 429/142 |
| 8,900,758 B2 | 12/2014 | Nemoto et al. | |
| 2003/0017386 A1 | 1/2003 | Daido et al. | |

(Continued)

FOREIGN PATENT DOCUMENTS

| | | |
|---|---|---|
| CN | 1252470 | 5/2000 |
| JP | 5-267103 | 10/1993 |

(Continued)

OTHER PUBLICATIONS

Google translation of "JIS 8222 Pulp—a method for preparing handsheets for testing" [online] <URL:http://kikakurui.com/p/P8222-1998-02.html>, retrieved on Feb. 28, 2017.*

Primary Examiner — Jonathan Crepeau
(74) Attorney, Agent, or Firm — Wenderoth, Lind & Ponack, L.L.P.

(57) ABSTRACT

A separator for electrochemical element, comprising a porous sheet that contains as a main fiber, a fibrillated solvent spun cellulose fiber with an average fiber length of 0.40 to 1.10 mm, has an average internal bond strength of 60 mJ or more in a thickness direction, and has a lowest internal bond strength of 30 mJ or more in the thickness direction, a process for producing the separator, and an electrochemical element using the separator. The separator for electrochemical element has strong mechanical strength and excellent processability.

8 Claims, 1 Drawing Sheet

(56) References Cited

U.S. PATENT DOCUMENTS

| | | | |
|---|---|---|---|
| 2007/0287062 A1 | 12/2007 | Tsukuda et al. | |
| 2010/0252426 A1* | 10/2010 | Tsukuda | H01G 9/02 204/296 |
| 2014/0072878 A1 | 3/2014 | Nemoto et al. | |
| 2015/0079479 A1* | 3/2015 | Hayakawa | H01M 2/145 429/252 |

FOREIGN PATENT DOCUMENTS

| | | |
|---|---|---|
| JP | 11-168033 | 6/1999 |
| JP | 2000-003834 | 1/2000 |
| JP | 2002-105235 | 4/2002 |
| JP | 2003-123728 | 4/2003 |
| JP | 2006-19191 | 1/2006 |
| JP | 2007-317675 | 12/2007 |
| JP | 2010/277800 | 12/2010 |
| JP | 2012-227116 | 11/2012 |
| WO | 2005/101432 | 10/2005 |
| WO | 2012/008559 | 1/2012 |
| WO | 2013/054888 | 4/2013 |

\* cited by examiner

SEPARATOR FOR ELECTROCHEMICAL ELEMENT, PROCESS FOR PRODUCING SEPARATOR AND ELECTROCHEMICAL ELEMENT USING SEPARATOR

TECHNICAL FIELD

The present invention relates to a separator for electrochemical element (hereinafter sometimes abbreviated as a "separator"), a process for producing the separator for electrochemical element, and an electrochemical element using the separator.

BACKGROUND ART

In association with recent spread and improvement in performance of mobile electronic devices, an electrochemical element with high energy density has been desired. As an electrochemical element of this type, a lithium ion secondary battery using an organic electrolyte (non-aqueous electrolyte) has gathered attention. An average voltage of the lithium ion secondary battery is 3.7 V, which is approximately three times of an average voltage of an alkaline secondary battery, and the lithium ion secondary battery has such high energy density. However, since the lithium ion secondary battery cannot use an aqueous electrolyte as the alkaline secondary battery does, it uses a non-aqueous electrolyte with sufficient oxidation-reduction resistance.

A capacitor, which is another kind of electrochemical element, has large electric capacity as well as high stability against repeated charges and discharges. Accordingly, it is widely used for an application to a power feeding source or a similar device used for vehicles and electrical devices.

Among the above-described separators for electrochemical element, a film-shaped porous film made of polyolefin is often used as a separator for lithium ion secondary battery (for example, see Patent Document 1). However, this separator for lithium ion secondary battery has low electrolyte-retaining ability, and therefore has low ion conductivity, causing a problem of high internal resistance.

Furthermore, as a separator for lithium ion secondary battery, nonwoven separators made of synthetic fiber have been proposed (for example, see Patent Documents 2~4). However, these separators have the following problems. Due to low electrolyte-retaining ability, the internal resistance becomes high. Moreover, since the separators have insufficient denseness, they cause high proportion defective in internal short-circuit and poorness of high rate characteristics, discharge characteristics, and their variations.

As separators for lithium ion secondary battery, there have been proposed a separator made of fibrillated heat-resistant fiber, fibrillated cellulose, or non-fibrillated fiber; and a separator made of fibrillated solvent spun cellulose fiber or synthetic fiber (for example, see Patent Documents 5 and 6). However, these separators yet have room for improvement in strength thereof.

As the separator for capacitor, a separator made of paper mainly containing beaten solvent spun cellulose fiber or beaten regenerated cellulose fiber has been used (for example, see Patent Documents 7~9). Nowadays, for thinning the separator for capacitor, there has been proposed a separator formed by laminating two or more fiber layers (for example, see Patent Document 10). However, since this separator is formed by laminating a layer made of synthetic fiber and a layer made of a fibrillated solvent spun cellulose fiber, adhesive strength between the layers is insufficient, which is likely to cause a problem of delamination.

Actually, to incorporate the separator for electrochemical element into the electrochemical element, the separator needs to be cut as necessary. However, if the cutting processability of the separator and the quality of the cut section of the separator are poor, fiber naps generated at the cut section and fallen fibers may deteriorate characteristics of a final electrochemical element.

PRIOR ART DOCUMENTS

Patent Documents

[PATENT DOCUMENT 1] JP 2002-105235A
[PATENT DOCUMENT 2] JP 2003-123728A
[PATENT DOCUMENT 3] JP 2007-317675A
[PATENT DOCUMENT 4] JP 2006-19191A
[PATENT DOCUMENT 5] WO 2005/101432
[PATENT DOCUMENT 6] WO 2012/8559
[PATENT DOCUMENT 7] JP Hei 5-267103A
[PATENT DOCUMENT 8] JP Hei 11-168033
[PATENT DOCUMENT 9] JP 2000-3834A
[PATENT DOCUMENT 10] JP 2010-277800A

SUMMARY OF INVENTION

Problem to be Solved by Invention

The present invention has been made in consideration of the above-described circumstances, and an object of the present invention is to provide a separator for electrochemical element that has high mechanical strength and excellent processability, a process for producing the separator, and an electrochemical element using the separator.

Means for Solving Problem

As a result of intensive and extensive studies to solve the above-described problems, the present inventors have completed the following invention.
(1) A separator for electrochemical element, comprising a porous sheet that contains as a main fiber, a fibrillated solvent spun cellulose fiber with an average fiber length of 0.40 to 1.10 mm, has an average internal bond strength of 60 mJ or more in a thickness direction, and has a lowest internal bond strength of 30 mJ or more in the thickness direction.
(2) A process for producing a separator for electrochemical element, comprising a porous sheet that contains as a main fiber, a fibrillated solvent spun cellulose fiber with an average fiber length of 0.40 to 1.10 mm, has an average internal bond strength of 60 mJ or more in a thickness direction, and has a lowest internal bond strength of 30 mJ or more in the thickness direction,
wherein the porous sheet is prepared by a paper-making method, in which a wet press treatment of two or more nips is performed at least on the porous sheet.
(3) A process for producing a separator for electrochemical element, comprising a porous sheet that contains as main fiber, a fibrillated solvent spun cellulose fiber with an average fiber length of 0.40 to 1.10 mm, has an average internal bond strength of 60 mJ or more in a thickness direction, and has a lowest internal bond strength of 30 mJ or more in the thickness direction,
wherein the porous sheet is prepared by a paper-making method, in which both surfaces of the porous sheet are contacted with a heated cylinder roll at least once.

(4) A separator for electrochemical element produced by the process for producing the separator for electrochemical element recited in above (2) or (3).
(5) An electrochemical element comprising the separator for electrochemical element recited in above (1) or (4).

Effect of Invention

The separator for electrochemical element of the present invention is formed of a porous sheet that contains as a main fiber, a fibrillated solvent spun cellulose fiber with an average fiber length of 0.40 to 1.10 mm. Since the separator has an average internal bond strength of 60 mJ or more in a thickness direction, bonding between the fibrillated solvent spun cellulose fibers is increased and the mechanical strength of the entire porous sheet is improved. Furthermore, since the separator has a lowest internal bond strength of 30 mJ or more in the thickness direction, generation of the naps and falling of the fibers can be reduced during cutting the separator.

Since the porous sheet is produced by the paper-making method, in which wet press treatment of two or more nips is performed at least on the porous sheet, there can be produced easily the porous sheet whose average internal bond strength in the thickness direction is 60 mJ or more and the lowest internal bond strength in the thickness direction is 30 mJ or more.

Since the porous sheet is produced by the paper-making method, in which both surfaces of the porous sheet are contacted with a heated cylinder roll at least once, there can be produced easily the porous sheet whose average internal bond strength in the thickness direction is 60 mJ or more and the lowest internal bond strength in the thickness direction of 30 mJ or more.

EMBODIMENTS FOR CARRYING OUT INVENTION

Figure 1:
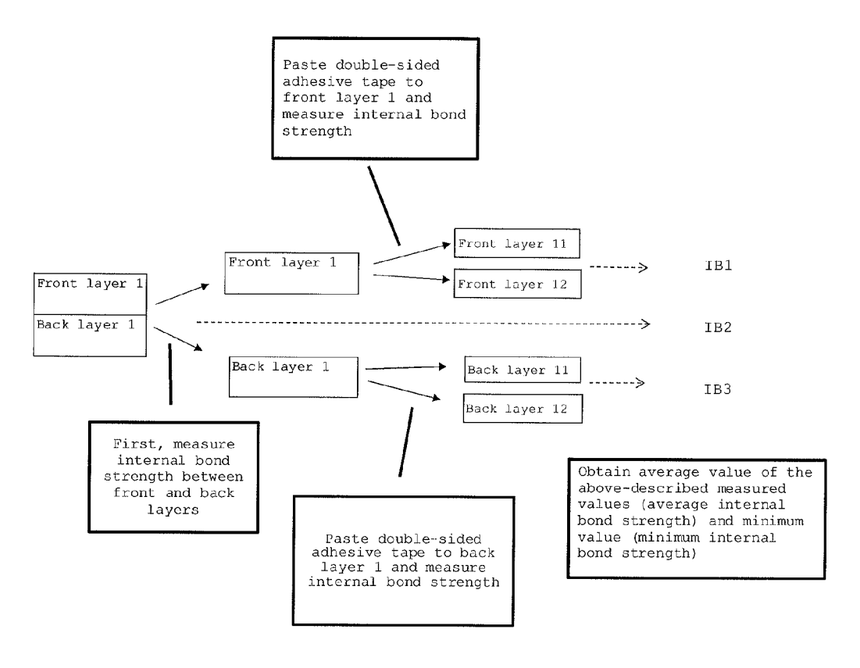
The FIGURE is a scheme diagram for measurement of internal bond strength in a thickness direction of a separator for electrochemical element.

A solvent spun cellulose fiber used in the present invention differs from so-called regenerated cellulose fiber such as the conventional viscose rayon and cuprammonium rayon, which is formed by once chemically transforming cellulose into a cellulose derivative and then restoring it to cellulose again. The solvent spun cellulose fiber means a fiber formed by dry-wet spinning a spinning undiluted solution dissolved in an amine oxide, into water without chemically changing the cellulose to precipitate the cellulose. The solvent spun cellulose fiber has molecules highly arranged in a fiber longitudinal axis direction compared with natural cellulose fiber, bacterial cellulose fiber, and rayon fiber. If mechanical force, such as friction, is applied in a wet state, the solvent spun cellulose fiber is likely to be refined, generating thin and elongated microfilaments. Since the refined solvent spun cellulose fiber solidly holds an electrolyte between the microfilaments, it has excellent electrolyte-retaining ability compared with refined products of the natural cellulose fiber, bacterial cellulose fiber and rayon fiber. As a result, the internal resistance of an electrochemical element can be reduced, and an electrochemical element having excellent discharge characteristics in particular at a high rate can be obtained.

In the present invention, a fibrillated solvent spun cellulose fiber with an average fiber length of 0.40 to 1.10 mm is used. The average fiber length of the solvent spun cellulose fiber is preferable to be 0.60 to 1.10 mm, and more preferable to be 0.65 to 1.05 mm. If the average fiber length is longer than 1.10 mm, the denseness of the separator becomes insufficient, which deteriorates a degree of bonding between the fibers, resulting in deterioration of the mechanical strength. If the average fiber length is shorter than 0.40 mm, an efficiency of water squeezing from a wet paper at a wet press unit of a paper machine during production of the separator is deteriorated, and as a result the degree of bonding between the fibers is lowered, and the fibers are likely to fall.

The average fiber length of the solvent spun cellulose fiber of the present invention is measured using KajaaniFiberLabV3.5 (manufactured by Metso Automation Inc.). The "average fiber length" in the present invention means a "length-weighted average fiber length" obtained by measuring and calculating the shortest length (l) between both end portions of a bent fiber.

As a method of producing a fibrillated solvent spun cellulose fiber with the average fiber length of 0.40 to 1.10 mm, there are exemplified those using a refiner, a beater, a mill, a grinding apparatus, a rotary blade homogenizer, which gives a shear force with a high speed rotary blade, a double-cylinder type high speed homogenizer, which generates a shear force between a cylinder-shaped inner blade rotating at a high speed and a stationary outer blade, an ultrasonic crushing machine, which achieves fiber-refining by the impact of ultrasonic wave, and a high pressure homogenizer, which applies a shear force and a cutting force to the fibers by giving at least 20 MPa of pressure difference to a fiber suspension and allowing the suspension go through a small diameter orifice so as to gain a high speed, and then allowing it to collide and sharply reduce the speed. Among these methods, in particular, the method using a refiner is preferable.

In the separator for electrochemical element of the present invention, a content of the solvent spun cellulose fiber with the average fiber length of 0.40 to 1.10 mm, which is a main fiber, is 50 to 100% by mass. The content of the solvent spun cellulose fiber with the average fiber length of 0.40 to 1.10 mm is preferable to be 60 to 95% by mass, more preferable to be 70 to 90% by mass. If the content of the solvent spun cellulose fiber with the average fiber length of 0.40 to 1.10 mm is less than 50% by mass, the internal resistance of the separator is increased due to insufficient electrolyte-retaining ability, and a proportion defective in internal short-circuit is increased due to insufficient denseness of the separator. Additionally, the degree of intimate contact between the solvent spun cellulose fibers is lowered, and this is likely to generate naps and fallen fibers from an incision during cutting the separator.

Since the separator for electrochemical element of the present invention employs as a main fiber, the solvent spun cellulose fiber with the average fiber length of 0.40 to 1.10 mm, the mechanical strength characteristics of the separator is greatly influenced by the single filament strength of the fiber alone, a degree of entanglement of the fibers and a degree of adhesion between the fibers. In particular, the degree of entanglement of the fibers and the degree of adhesion between the fibers in the separator are determined by the structure of a porous sheet and the bonding between the fibers generated when water comes out from the fiber surface during producing the porous sheet. Specifically, they are adjusted by a condition of water squeezing at a wet press unit of a paper machine, and a condition of drying at a dryer unit.

In the present invention, the internal bond strength of the separator for electrochemical element in a thickness direction is a value measured by an internal bond tester, which evaluates the internal bond strength of a paper and a board in compliance with JAPAN TAPPI (J. TAPPI) paper pulp testing method No. 18-2: 2000 "Paper and board-Determination of internal bond strength Part 2: Internal bond tester method." Following the scheme illustrated in the FIGURE, first, the internal bond strength (IB2) between front and back layers of the separator was measured. Then, the separator was divided to obtain a front layer 1 and a back layer 1. Then, a double-sided adhesive tape was pasted to the respective front layer 1 and back layer 1, and internal bond strengths (IB1 and IB3) were measured. Thus, the internal bond strength was measured at least at three portions of the separator in the thickness direction. With respect to each portion, measurements were made regarding a flow direction (MD) of the separator and a direction (CD) perpendicular to the flow direction. The average value of the values measured in both directions was regarded as the internal bond strength at the portion. Regarding the thickness direction, the average value of the internal bond strengths measured at the three portions was defined as "average internal bond strength" and the lowest value was defined as the "lowest internal bond strength."

The separator for electrochemical element of the present invention was considerably thin. The degree of entanglement and the degree of adhesion of the fibers are different in the thickness direction. The average value of the internal bond strengths (average internal bond strengths) measured at the plurality of portions in the thickness direction gives an influence on the mechanical strength of the entire separator for electrochemical element of the present invention. When the average internal bond strength of the separator in the thickness direction is 60 mJ or more, the tensile strength of the entire separator is improved. Furthermore, when the lowest internal bond strength of the separator in the thickness direction is 30 mJ or more, the generation of the naps and falling of the fibers from the incision during cutting the separator can be reduced.

The average internal bond strength and the lowest internal bond strength of the separator for electrochemical element can be adjusted by operating conditions during the production of the separator. For example, when the paper machine squeezes water at the wet press unit, there are effectively used a method of enhancing squeezing efficiency of water by increasing linear pressure and a method of removing water from both surfaces of the separator by pressing in multiple stages, not by pressing in one stage. In the case where the separator in a wet paper state is dried at a dryer, applying a heated cylinder roll to the wet paper is a general method, and increasing a temperature of the cylinder roll is effective to enhance the internal bond strength of the separator. In particular, drying the separator such that the heated cylinder roll is applied to both surfaces of the separator at least once for each is effective means to reduce a variation of the internal bond strength in the thickness direction. For example, the method of drying the separator such that the heated cylinder roll is applied to both surfaces of the separator at least once for each includes a method of using two yankee dryers such that the respective both surfaces of the separator are applied to the cylinder roll, a method of using a multi-cylinder dryer, a method of using both the yankee dryer and the multi-cylinder dryer.

The separator for electrochemical element of the present invention can optionally include a synthetic fiber and a cellulose fiber other than the solvent spun cellulose fiber, together with the solvent spun cellulose fiber with the average fiber length of 0.40 to 1.10 mm, which is a main fiber.

The synthetic fiber includes a single filament and a composite fiber made of a resin such as polyester, acrylic resin, polyolefin, wholly aromatic polyester, wholly aromatic polyester amide, polyamide, semi-aromatic polyamide, wholly aromatic polyamide, wholly aromatic polyether, wholly aromatic polycarbonate, polyimide, polyamide-imide (PAI), polyether ether ketone (PEEK), polyphenylene sulfide (PPS), poly-p-phenylene benzobisoxazole (PBO), polybenzimidazole (PBI), Polytetrafluoroethylene (PTFE), and ethylene-vinylalcohol copolymer. These synthetic fibers may be used alone or in combination of two or more kinds. Alternatively, various kinds of splittable composite fibers may be used after being splitted. Among these, polyester, acrylic, resin polyolefin, wholly aromatic polyester, wholly aromatic polyester amide, polyamide, semi-aromatic polyamide, and wholly aromatic polyamide are preferable, and polyester, acrylic resin, and polyolefin are more preferable. Compared with other synthetic fibers, polyester, acrylic resin, and polyolefin are entangled uniformly with the fibrillated solvent spun cellulose fiber and a network structure is easily formed. This allows obtaining the separator for electrochemical element excellent in denseness and mechanical strength.

An average fiber diameter of the synthetic fiber is preferable to be 0.1 to 20 μm, more preferable to be 0.1 to 15 μm, and further preferable to be 0.1 to 10 μm. If the average fiber diameter is less than 0.1 μm, the fiber is too thin and therefore it may fall from the separator. If the average fiber diameter is thicker than 20 μm, thinning the thickness of the separator may be difficult.

The fiber length of the synthetic fiber is preferable to be 0.1 to 15 mm, more preferable to be 0.5 to 10 mm, and further preferable to be 2 to 5 mm. If the fiber length is shorter than 0.1 mm, it may fall from the separator. If longer than 15 mm, the fiber may be tangled and produce a lump, possibly causing unevenness in the thickness of the separator.

If the separator for electrochemical element of the present invention contains a synthetic fiber, the content of the synthetic fiber is preferable to be 50% by mass or less. The content of the synthetic fiber is more preferable to be 5 to 40% by mass, and further preferable to be 10 to 30% by mass. If a content of the synthetic fiber exceeds 50% by mass, the internal resistance of the separator is increased due to insufficient electrolyte-retaining ability and the proportion defective in internal short-circuit is increased due to insufficient denseness of the separator.

The separator for electrochemical element of the present invention can also employ other cellulose fiber than the fibrillated solvent spun cellulose fiber with the average fiber length of 0.40 to 1.10 mm, which is a main fiber. For example, a fibrillated natural cellulose fiber with the average fiber length of 0.20 to 1.00 mm is preferably contained in an amount of 20% by mass or less. The content of the fibrillated natural cellulose fiber is more preferable to be 10% by mass or less, and further preferable to be 5% by mass or less. The fibrillated natural cellulose fiber tends to be inferior to uniformity of thickness of a single filament compared with the solvent spun cellulose fiber; however, it has characteristics that the physical entanglement between the fibers and hydrogen bonding strength are strong. If the content of the fibrillated natural cellulose fiber exceeds 20% by mass, a film is formed on the surface of the separator, which inhibits ion conductivity, possibly resulting in high internal resistance and low discharge characteristics.

As the method of fibrillating a natural cellulose fiber, there are exemplified those using a refiner, a beater, a mill, a grinding apparatus, a rotary blade homogenizer, which gives a shear force with a high speed rotary blade, a double-cylinder type high speed homogenizer, which generates a shear force between a cylinder-shaped inner blade rotating at a high speed and a stationary outer blade, an ultrasonic crushing machine, which achieves fiber-refining by the impact of ultrasonic wave, and a high pressure homogenizer, which applies a shear force and a cutting force to the fibers by giving at least 20 MPa of pressure difference to a fiber suspension and allowing the suspension go through a small diameter orifice so as to gain a high speed, and then allowing it to collide and sharply reduce the speed. Among these methods, in particular, the method using a high pressure homogenizer is preferable.

The separator for electrochemical element can be produced by a paper-making method using a paper machine with a paper-making wire such as a cylinder wire, a Fourdrinier wire, a tanmo wire, an inclined wire, or a combination paper machine composed of the same type or different types of paper-making wires selected among above paper-making wires. To reduce a variation in the internal bond strength in a thickness direction, it is desirable to perform the paper-making in a single layer. In addition to fiber raw materials, additives such as a dispersant, a thickner, an inorganic fillar, an organic fillar, a defoamer may be added to a raw material slurry as necessary to regulate the raw material slurry to a solid content concentration of around 5 to 0.001% by mass. The raw material slurry thus prepared is further diluted to a predetermined concentration, and then a paper is made from this slurry. If necessary, the separator for electrochemical element obtained through the paper-making may be subjected to a hot calender treatment, a heating treatment, or a similar treatment.

The thickness of the separator for electrochemical element is preferable to be 6 to 50 μm, more preferable to be 8 to 45 μm, and further preferable to be 10 to 40 μm. The thickness of less than 6 μm may fail to obtain sufficient mechanical strength, may cause a high proportion defective in internal short-circuit and a variation of the discharge characteristics due to insufficient insulating property between a positive electrode and a negative electrode, or may worsen a capacity retention rate and cycle characteristics. The thickness of more than 50 μm may increase the internal resistance of the electrochemical element or may lower the discharge characteristics. Note that in the present invention, the thickness of the separator means a value measured by the method specified in JIS B7502, that is, a value measured by an outside micrometer under a load of 5 N.

In the separator for electrochemical element, an average pore size is preferably 0.10 μm or more and a maximum pore size is preferably 6 μm or less. Entangling the solvent spun cellulose fiber with average fiber length of 0.40 to 1.10 mm can achieve this average pore size. The average pore size of less than 0.10 μm may increase the internal resistance of the electrochemical element and may lower the discharge characteristics. The maximum pore size of more than 6 μm may increase the proportion defective in internal short-circuit of the electrochemical element and the variation of the discharge characteristics. The average pore size of 0.10 μm or more and the maximum pore size of 4 μm or less are more preferable. The average pore size of 0.15 μm or more and the maximum pore size of 3 μm or less are further preferable.

A basis weight of the separator for electrochemical element is preferable to be 5 to 40 g/m$^2$, more preferable to be 7 to 30 g/m$^2$, and further preferable to be 10 to 20 g/m$^2$. The basis weight of less than 5 g/m$^2$ may fail to obtain sufficient mechanical strength, or may increase the proportion defective in internal short-circuit and the variation of the discharge characteristics due to insufficient insulating property between a positive electrode and a negative electrode. The basis weight of exceeding 40 g/m$^2$ may increase the internal resistance of the electrochemical element and may lower the discharge characteristics.

In the present invention, electrochemical element includes a lithium ion secondary battery, a lithium ion polymer secondary battery, a capacitor, or a similar element.

As a negative electrode active material of the lithium ion secondary battery, there are employed a carbon material such as graphite and coke; a metallic lithium; an alloy of lithium and one or more metals selected from aluminum, silicon, tin, nickel and lead; a metallic oxide such as SiO, SnO, $Fe_2O_3$, $WO_2$, $Nb_2O_5$, and $Li_{4/3}Ti_{5/3}O_4$; and a nitride such as $Li_{0.4}CoN$. As a positive electrode active material, there are employed lithium cobaltate, lithium manganate, lithium nickelate, lithium titanate, lithium nickel manganese oxide, and lithium iron phosphate. Furthermore, the lithium iron phosphate may be compounded with one or more metals selected from manganese, chromium, cobalt, copper, nickel, vanadium, molybdenum, titanium, zinc, aluminum, gallium, magnesium, boron and niobium.

As the electrolyte of the lithium ion secondary battery there are employed those prepared by dissolving a lithium salt in an organic solvent such as propylene carbonate, ethylene carbonate, dimethyl carbonate, diethyl carbonate, dimethoxyethane, dimethoxymethane, and a mixture thereof. The lithium salt includes lithium hexafluorophosphate ($LiPF_6$), lithium tetrafluoroborate ($LiBF_4$) or a similar compound. As a solid electrolyte, there are employed those prepared by dissolving a lithium salt in a gel-like polymer such as polyethylene glycol and its derivative, polymethacrylic acid derivative, polysiloxane and its derivative and polyvinylidene fluoride.

A capacitor which is constituted by sandwiching a dielectric or an electric double layer between opposed two electrodes, has a function to accumulate electricity. A capacitor using the dielectric includes an aluminum electric condenser (aluminum electrolytic capacitor) and a tantalum electric condenser (tantalum electrolytic capacitor). A capacitor using the electric double layer includes an electric double layer capacitor. As electrodes of the electric double layer capacitor, there are employed a pair of electric double layer capacitance electrodes, or a combination of electric double layer capacitance electrode and an oxidation reduction electrode.

As an electrolyte of the capacitor, there may be used any of aqueous solution-based electrolyte, organic solvent-based electrolyte, and electroconductive polymer. Non-limiting examples of the organic solvent-based electrolyte includes an electrolyte prepared by dissolving an ion-dissociative salt in an organic solvent, and an ionic liquid (solid molten salt). As the organic solvent is selected from dimethyl carbonate, diethyl carbonate, ethylene carbonate, propylene carbonate, acetonitrile, propionitrile, γ-butyrolacton, α-methyl-γ-butyrolactone, β-methyl-γ-butyrolactone, γ-valerolactone, 3-methyl-γ-valerolactone, dimethyl sulfoxide, diethyl sulfoxide, dimethylformamide, diethylformamide, tetrahydrofuran, dimethoxyethane, dimethylsulfolan, sulfolane, ethylene glycol, propylene glycol, and methyl cellosolve. However, this should not be limited to these. The electroconductive polymer includes polypyrrole, polythiophene, polyaniline, polyacetylene and their derivatives.

EXAMPLES

The present invention is further explained in detail with reference to examples; however, the present invention is not limited to these examples. The "parts" and "percents" in the examples are all based on "mass" unless otherwise specified.
<Preparation of Solvent Spun Cellulose Fiber>
Unprocessed solvent spun cellulose fiber (1.7 dtex fiber) was dispersed in its concentration of 2%, and then treated with a double disk refiner manufactured by AIKAWA IRON WORKS CO., LTD while changing the process time to prepare fibrillated solvent spun cellulose fibers with different average fiber lengths.
<Synthetic Fiber B1>
Polyethylene terephthalate fiber with an average fiber diameter of 3 μm and a fiber length of 3 mm was used as a synthetic fiber B1.

Examples 1 to 17 and Comparative Examples 1 to 4

Separator

In accordance with the raw materials and amounts listed in Table 1, paper-making slurries were prepared. Wet paper-making was performed using a cylinder paper machine to prepare separators of Examples 1~15 and Comparative Examples 1~4 each consisting of a porous sheet with a basis weight of 15 g/m² and a thickness of 20 μm. In Example 16, wet paper-making was performed using an inclined wire paper machine to prepare a separator made of a porous sheet with a basis weight of 15 g/m² and a thickness of 20 μm. In Example 17, a combination paper machine with an inclined wire and a cylinder wire was employed and wet paper-making was performed by a stacking paper-making method such that the basis weight ratio (inclined wire:cylindrical wire) became 50:50 to prepare a separator consisting of a two-layered porous sheet with a basis weight of 15 g/m² and a thickness of 20 μm. The thickness of the separator was adjusted by calender treatment at room temperature. The basis weight of the separator was measured in compliance with JIS P8124. The thickness of the separator was measured by the method specified in JIS B7502, that is, measured with an outside micrometer under a load of 5 N.
<Wet-Press Conditions During Production of Separator>
When producing the separators of Examples 1 to 17 and Comparative Examples 1 to 4, each of the wet papers was wet pressed in accordance with the conditions listed in Table 1. The "One nip" described in the "Number of presses" row in Table 1 means that the wet paper is subjected to wet press treatment by one-time nip with double felt at the linear pressure described in the "Linear Pressure" row in Table 1. The "Two nips" described in the "Number of presses" row in Table 1 means that the wet paper is subjected to wet press treatment by two-time nips with double felt at the linear pressure described in the "Linear Pressure" row in Table 1.
<Drying Conditions During Production of Separator>
When producing the separators of the Examples 1 to 17 and Comparative Examples 1 to 4, each of the wet papers was brought into contact with a heated yankee dryer (yankee cylinder, yankee dryer) and dried in accordance with the conditions listed in Table 1. The "One surface" described in the "Drying method" row in Table 1 means that only one surface of the wet paper was brought into contact with the yankee dryer heated to the temperature adscript in the "Dryer temperature" row in Table 1 for drying. The "Both surfaces" described in the "Drying method" row in Table 1 means that one surface of the wet paper was brought into contact with the yankee dryer heated to the temperature described in the "Dryer temperature" row in Table 1, and then the other surface of the wet paper was brought into contact with the heated yankee dryer for drying.

TABLE 1

| | Example/ Comparative Example | Solvent spun cellulose fiber | | Synthetic fiber | | Wet-press conditions | | Drying conditions | |
|---|---|---|---|---|---|---|---|---|---|
| | | Average fiber length (mm) | Number of parts (parts) | Type | Number of parts (parts) | Number of presses | Linear pressure (N/m) | Drying method | Dryer temperature (° C.) |
| (A) | Example 1 | 0.40 | 100 | | | One nip | 250 | One surface | 115 |
| | Example 2 | 0.60 | 100 | | | One nip | 250 | One surface | 115 |
| | Example 3 | 0.65 | 100 | | | One nip | 250 | One surface | 115 |
| | Example 4 | 0.80 | 100 | | | One nip | 250 | One surface | 115 |
| | Example 5 | 1.05 | 100 | | | One nip | 250 | One surface | 115 |
| | Example 6 | 1.10 | 100 | | | One nip | 250 | One surface | 115 |
| | Comparative example 1 | 0.39 | 100 | | | One nip | 250 | One surface | 115 |
| | Comparative example 2 | 1.15 | 100 | | | One nip | 250 | One surface | 115 |
| (B) | Example 4 | 0.80 | 100 | | | One nip | 250 | One surface | 115 |

TABLE 1-continued

| | | Solvent spun cellulose fiber | | Synthetic fiber | | Wet-press conditions | | Drying conditions | |
|---|---|---|---|---|---|---|---|---|---|
| | Example/ Comparative Example | Average fiber length (mm) | Number of parts (parts) | Type | Number of parts (parts) | Number of presses | Linear pressure (N/m) | Drying method | Dryer temperature (° C.) |
| | Example 7 | 0.80 | 100 | | | One nip | 350 | One surface | 115 |
| | Example 8 | 0.80 | 100 | | | One nip | 500 | One surface | 115 |
| | Example 9 | 0.80 | 100 | | | Two nips | 250 | One surface | 115 |
| | Comparative Example 3 | 0.80 | 100 | | | One nip | 200 | One surface | 115 |
| (C) | Example 4 | 0.80 | 100 | | | One nip | 250 | One surface | 115 |
| | Example 10 | 0.80 | 100 | | | One nip | 250 | One surface | 120 |
| | Example 11 | 0.80 | 100 | | | One nip | 250 | One surface | 130 |
| | Example 12 | 0.80 | 100 | | | One nip | 250 | Both surfaces | 115 |
| | Example 13 | 0.80 | 100 | | | One nip | 250 | Both surfaces | 120 |
| | Comparative Example 4 | 0.80 | 100 | | | One nip | 250 | One surface | 105 |
| (D) | Example 4 | 0.80 | 100 | | | One nip | 250 | One surface | 115 |
| | Example 14 | 0.80 | 95 | PET | 5 | One nip | 250 | One surface | 115 |
| | Example 15 | 0.80 | 80 | PET | 20 | One nip | 250 | One surface | 120 |
| (E) | Example 4 | 0.80 | 100 | | | One nip | 250 | One surface | 115 |
| | Example 16 | 0.80 | 100 | | | One nip | 250 | One surface | 115 |
| | Example 17 | 0.80 | 100 | | | One nip | 250 | One surface | 115 |

[Internal Bond Strength]

In compliance with J. TAPPI paper pulp testing method No. 18-2: 2000 "Paper and board-Determination of internal bond strength of the separator Part 2: Internal bond tester method", the internal bond strength was measured. Following the scheme illustrated in the FIGURE, the internal bond strength was measured at three portions of the separator at least in a thickness direction. With respect to each portion, measurement was made in the flow direction (MD) of the separator and in the direction (CD) perpendicular to the flow direction, and the average value of the values measured in both directions was regarded as the internal bond strength at the portion. Regarding the thickness direction, the average value of the internal bond strengths measured at the three portions was defined as "average internal bond strength" and the lowest value was defined as the "lowest internal bond strength." The results were shown in Table 2.

The following evaluations were conducted on the separators of Examples 1 to 17 and Comparative Examples 1 to 4 and the results were shown in Table 2.

[Tensile Strength]

With reference to JIS P8113: 2006 "Paper and board-Determination of tensile properties", a tensile test was conducted on the separator under the conditions of a test width of 50 mm, a test length (average interval of grip line) of 100 mm, and a tensile speed of 300 mm/min using a desktop material testing machine (manufactured by Orientec Co., LTD., model name: STA-1150) to measure a maximum load. The measurement was made both in the flow direction of the separator and in the direction perpendicular to the flow direction. An average value of the values measured in both directions was regarded as the tensile strength of the separator.

[Evaluation on Processability]

Using the separator of each of Examples 1 to 17 and Comparative Examples 1 to 4, a slit-process sample with a width of 5.0 mm and a length of 20 m was prepared. The slit-process sample was cut at the width of 5.0 mm and the length of 50 mm, and the cut section thereof was observed with a loupe having a scale for evaluation to evaluate processability with the following criteria.

"5": The cut section is smooth, and naps and fallen fibers are not observed.

"4": Very small naps are occasionally observed.

"3": Small naps are observed, and the cut section was slightly irregular.

"2": Less than five naps with a length of 0.5 mm or more are observed. This is a lower limit level for actual use.

"1": More than five naps with a length of 0.5 mm or more are observed. This is an unusable level.

[Slit Process Yield]

Using the separator of each of Examples 1 to 17 and Comparative Examples 1 to 4, 100 rolls of a slit process sample with a width of 5.0 mm and a length of 20 m were prepared. A ratio of the number of rolls of the sample with no paper bursting and uncut portion, to 100 rolls of the sample was set as a "slit process yield (%)."

TABLE 2

| | Example/Comparative Example | Average internal bond strength (mJ) | Lowest internal bond strength (mJ) | Tensile strength (N/m) | Evaluation on processability | Slit process yield (%) |
|---|---|---|---|---|---|---|
| (A) | Example 1 | 64 | 32 | 458 | 2 | 90 |
| | Example 2 | 70 | 50 | 478 | 2 | 92 |
| | Example 3 | 76 | 59 | 502 | 3 | 94 |
| | Example 4 | 76 | 57 | 502 | 3 | 95 |
| | Example 5 | 76 | 54 | 486 | 3 | 95 |
| | Example 6 | 64 | 41 | 478 | 2 | 91 |
| | Comparative Example 1 | 38 | 24 | 365 | 1 | 80 |
| | Comparative Example 2 | 60 | 26 | 446 | 1 | 86 |
| (B) | Example 4 | 76 | 57 | 502 | 3 | 95 |
| | Example 7 | 78 | 60 | 508 | 4 | 97 |
| | Example 8 | 79 | 67 | 518 | 5 | 98 |
| | Example 9 | 80 | 68 | 527 | 5 | 99 |
| | Comparative Example 3 | 46 | 25 | 401 | 1 | 85 |
| (C) | Example 4 | 76 | 57 | 502 | 3 | 95 |
| | Example 10 | 78 | 61 | 506 | 4 | 97 |
| | Example 11 | 79 | 63 | 513 | 4 | 98 |
| | Example 12 | 80 | 68 | 519 | 5 | 99 |
| | Example 13 | 81 | 69 | 530 | 5 | 100 |
| | Comparative Example 4 | 72 | 26 | 466 | 1 | 87 |
| (D) | Example 4 | 76 | 57 | 502 | 3 | 95 |
| | Example 14 | 76 | 54 | 518 | 3 | 94 |
| | Example 15 | 74 | 54 | 527 | 3 | 93 |
| (E) | Example 4 | 76 | 57 | 502 | 3 | 95 |
| | Example 16 | 76 | 63 | 513 | 4 | 98 |
| | Example 17 | 76 | 50 | 495 | 2 | 92 |

From comparison between Examples 1 to 6 and Comparative Examples 1 and 2 shown in (A) in Table 1 and (A) in Table 2, it was found that since the separators of Examples 1 to 6 were formed of a porous sheet that contains as a main fiber, a fibrillated solvent spun cellulose fiber with an average fiber length of 0.40 to 1.10 mm, has an average internal bond strength in a thickness direction of 60 mJ or more, and has a lowest internal bond strength in the thickness direction of 30 mJ or more, they exhibited strong tensile strength, and excellent processability and slit process yield.

From Comparison between Examples 4 and 7 to 9 and Comparative Example 3 shown in (B) in Table 1 and (B) in Table 2, it was found that increasing a linear pressure and increasing a number of presses at the wet press treatment increased a bonding force between the fibrillated solvent spun cellulose fibers. This also increased the average internal bond strength and the lowest internal bond strength in the thickness direction. Consequently, since the separators of Examples 4 and 7 to 9 were formed of a porous sheet that contains as a main fiber, a fibrillated solvent spun cellulose fiber with an average fiber length of 0.40 to 1.10 mm, has an average internal bond strength in the thickness direction of 60 mJ or more, and has a lowest internal bond strength in the thickness direction of 30 mJ or more, they exhibited stronger tensile strength, and improved processability and slit process yield.

From comparison between Examples 4, 7, and 8 and Example 9, it was found that the wet press treatment of two or more nips allowed performing the wet pressing on the wet paper without breaking the paper layer of the wet paper. Furthermore, the average internal bond strength and the lowest internal bond strength in the thickness direction were also increased. As a result, the tensile strength of the separator became stronger, and the processability and the slit process yield were further improved.

From comparison between Examples 4 and 10 to 13 and Comparative Example 4 shown in (C) in Table 1 and (C) in Table 2, it was found that increasing the temperature of the cylinder dryer to promote water removal from the fibrillated solvent spun cellulose fiber increased the bonding force between the solvent spun cellulose fibers, whereby, the average internal bond strength and the lowest internal bond strength in the thickness direction were also increased. Consequently, since the separators of Examples 4 and 10 to 13 were formed of a porous sheet that contains as a main fiber, a fibrillated solvent spun cellulose fiber with an average fiber length of 0.40 to 1.10 mm, has an average internal bond strength in the thickness direction of 60 mJ or more, and has a lowest internal bond strength in the thickness direction of 30 mJ or more, they exhibited stronger tensile strength, and improved processability and slit process yield.

From comparison between Examples 4, 10 and 11, and Examples 12 and 13, it was found that when the separator was dried such that both surfaces of the separator were applied to the heated cylinder roll at least once, the tensile strength of the separator became stronger and the processability and the slit process yield were further improved.

From comparison between Examples 4, 14 and 15 shown in (D) of Table 1 and (D) of Table 2, it was found that in case that the synthetic fiber was used together with the fibrillated solvent spun cellulose fiber, by adjusting the paper-making conditions, there can be obtained a porous sheets that contains as a main fiber, a fibrillated solvent spun cellulose fiber with the average fiber length of 0.40 to 1.10 mm, has an average internal bond strength in the thickness direction of 60 mJ or more, and has a lowest internal bond strength in the thickness direction is 30 mJ or more, and there can be provided a separator excellent in tensile strength and also excellent in processability and slit process yield.

From comparison between Examples 4, 16 and 17 shown in (E) of Table 1 and (E) of Table 2, it was found that in case that the paper-making was performed using the same raw material but different paper machines, by adjusting the operating conditions, there can be obtained porous sheets each of which contains as a main fiber, a fibrillated solvent spun cellulose fiber with the average fiber length of 0.40 to 1.10 mm, has an average internal bond strength in the thickness direction of 60 mJ or more and has a lowest internal bond strength in the thickness direction of 30 mJ or more, and there can be provided separators excellent in tensile strength and also excellent in processability and slit process yield. Compared with the separator of Example 17, which has the two-layer structure produced by the stacking paper-making method, the separators of Examples 4 and 16, which have a single layer structure, exhibited more excellent tensile strength and more excellent processability and slit process yield.

INDUSTRIAL APPLICABILITY

As the separator for electrochemical element of the present invention are preferable a separator for capacitor, a separator for lithium ion secondary battery, and a separator for lithium ion polymer secondary battery.

What is claimed is:

1. A separator for electrochemical element, comprising a porous sheet that contains as a main fiber, a fibrillated solvent spun cellulose fiber with an average fiber length of 0.40 to 1.10 mm, has an average internal bond strength of 60 mJ or more in a thickness direction, and has a lowest internal bond strength of 30 mJ or more in the thickness direction.

2. A process for producing a separator for electrochemical element, comprising a porous sheet that contains as a main fiber, a fibrillated solvent spun cellulose fiber with an average fiber length of 0.40 to 1.10 mm, has an average internal bond strength of 60 mJ or more in a thickness direction, and has a lowest internal bond strength of 30 mJ or more in the thickness direction,
  wherein the porous sheet is prepared by a paper-making method, in which a wet press treatment of two or more nips is performed at least on the porous sheet.

3. A process for producing a separator for electrochemical element, comprising a porous sheet that contains as a main fiber, a fibrillated solvent spun cellulose fiber with an average fiber length of 0.40 to 1.10 mm, has an average internal bond strength of 60 mJ or more in a thickness direction, and has a lowest internal bond strength of 30 mJ or more in the thickness direction,
  wherein the porous sheet is prepared by a paper-making method, in which both surfaces of the porous sheet are contacted with a heated cylinder roll at least once.

4. A separator for electrochemical element produced by the process for producing the separator for electrochemical element recited in claim 2.

5. An electrochemical element comprising the separator for electrochemical element recited in claim 1.

6. A separator for electrochemical element produced by the process for producing the separator for electrochemical element recited in claim 3.

7. An electrochemical element comprising the separator for electrochemical element recited in claim 4.

8. An electrochemical element comprising the separator for electrochemical element recited in claim 6.

* * * * *